(12) United States Patent
Fukushima

(10) Patent No.: US 6,236,428 B1
(45) Date of Patent: *May 22, 2001

(54) MULTI-EYE IMAGE SENSING AND RECORDING AND REPRODUCTION APPARATUS

(75) Inventor: Nobuo Fukushima, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/509,225

(22) Filed: Jul. 31, 1995

(30) Foreign Application Priority Data

Aug. 2, 1994 (JP) .................................................. 6-181610

(51) Int. Cl.$^7$ ........................... H04N 13/00; H04N 15/00

(52) U.S. Cl. ................................ 348/42; 348/43; 348/47; 348/53

(58) Field of Search .................. 348/47, 48, 42, 348/51, 52, 46, 43, 53; 345/9, 31–32, 139; 342/176, 180; 359/376, 462–477

(56) References Cited

U.S. PATENT DOCUMENTS

| | | | |
|---|---|---|---|
| 4,583,117 | * 4/1986 | Lipton et al. | 348/42 |
| 4,825,393 | * 4/1989 | Nishiya | 364/560 |
| 4,989,078 | * 1/1991 | Paxton | 348/51 |
| 5,140,415 | * 8/1992 | Choquet | 348/51 |
| 5,142,357 | * 8/1992 | Lipton et al. | 348/42 |
| 5,142,642 | * 8/1992 | Sudo | 348/42 |
| 5,193,000 | * 3/1993 | Lipton et al. | 348/51 |
| 5,428,386 | * 6/1995 | D'Alfonso et al. | 348/45 |
| 5,448,294 | * 9/1995 | Yamazaki | 348/230 |
| 5,510,831 | * 4/1996 | Mayhew | 348/47 |
| 5,534,918 | * 7/1996 | Torii et al. | 348/53 |

* cited by examiner

Primary Examiner—Vu Le
(74) Attorney, Agent, or Firm—Morgan & Finnegan, LLP

(57) ABSTRACT

Timing signal generators 24R and 24L, simultaneously initialized, synchronize image-sensing devices 21R and 21L with each other. Video signal processors 23R and 23L process the synchronized image signals, from the image sensing devices 21R and 21L, to obtain partial image signals from the synchronized image signals. The partial image signals are converted, using a Gate 29 and a memory 27, into a single-system image signal, in which the partial image signals are arranged in a horizontal direction within one field. Thus, an image signal having well-balanced horizontal and vertical resolutions is outputted. This allows ordinary VTR recording and reproduction.

12 Claims, 10 Drawing Sheets

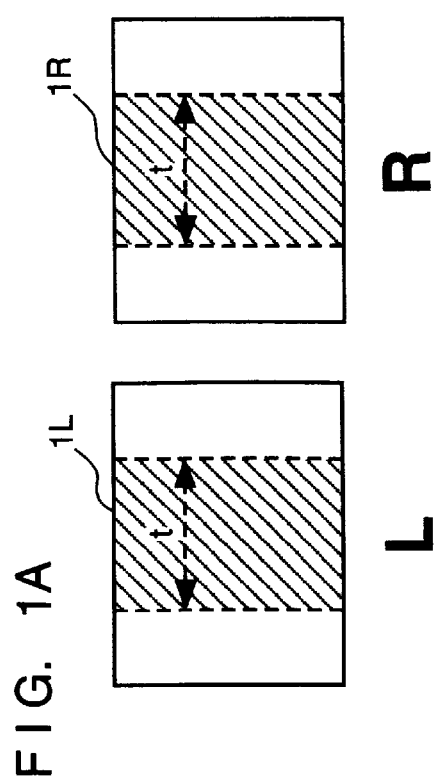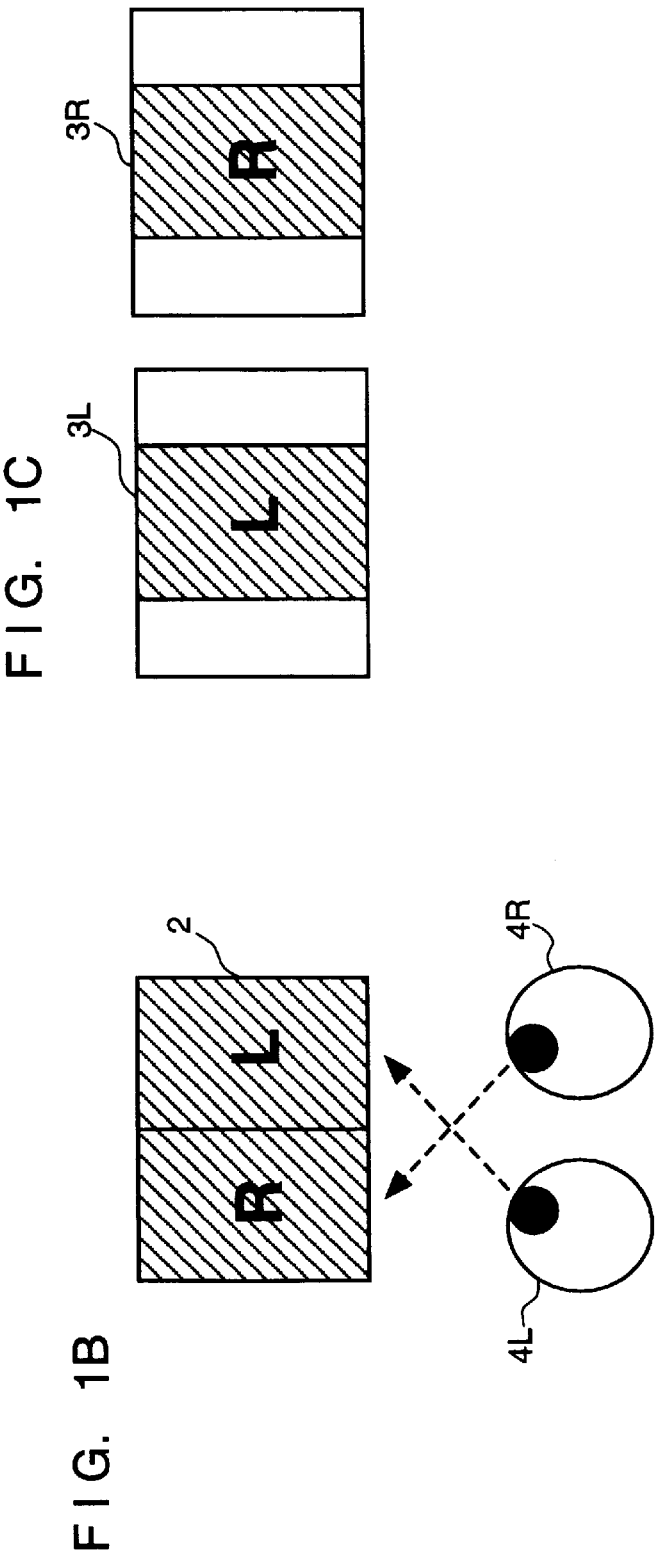

FIG. 6A
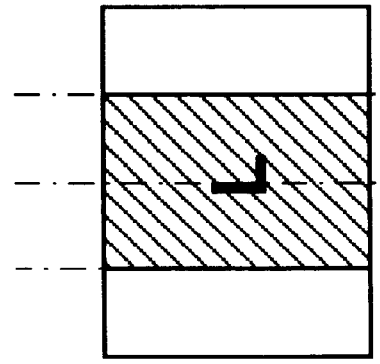 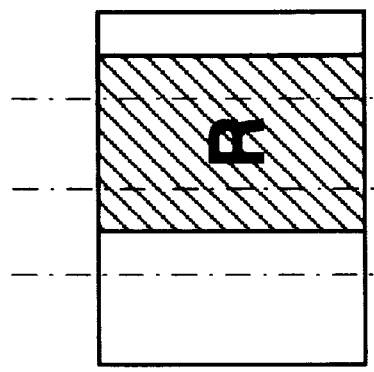
$Tc = \frac{1}{4} Th$
$Td = \frac{1}{8} Th$
FIG. 6B
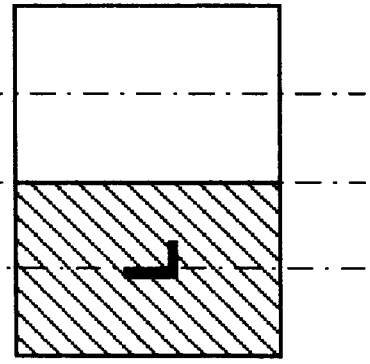 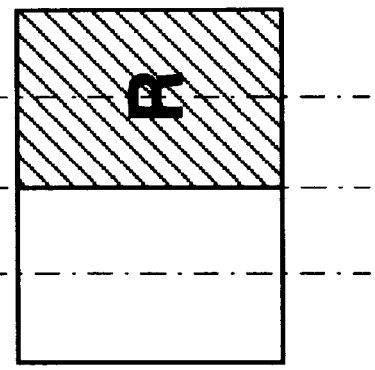
$Tc = \frac{1}{2} Th$
$Td = \frac{1}{2} Th$

MULTI-EYE IMAGE SENSING AND RECORDING AND REPRODUCTION APPARATUS

BACKGROUND OF THE INVENTION

Present invention relates to a multi-eye image sensing, recording and reproduction apparatus, which obtains a plurality of images with parallax using a plurality of image sensing means and, more particularly to an image-signal converting apparatus for converting images for stereoscopic vision into predetermined format signals, a display device for displaying images for stereoscopic vision, and a multi-eye image recording and reproduction apparatus for recording and reproducing images for stereoscopic vision.

As the first example of stereoscopic image recording apparatus, Japanese Patent Application Laid-Open No. 62-283792 has introduced, a construction that performs thinning of an image for the right eye (hereinafter referred to as "right image") and an image for the left eye (hereinafter referred to as "left image") in line units in a vertical direction to ½, and combines the vertically-compressed ½ images for obtaining stereoscopic vision.

As the second example of stereoscopic image recording apparatus, Japanese Patent Application Laid-Open No. 62-245784 discloses, a construction that compresses the right image and the left image in a horizontal direction.

Generally, in television display, the resolution in a horizontal direction is higher than that in a vertical direction. Accordingly, the vertical compression as in the first example further degrades the vertical resolution. On the other hand, the horizontal compression as in the second example lowers the horizontal resolution. Both cases impair the balance between the vertical and horizontal resolutions of a television signal.

SUMMARY OF THE INVENTION

The present invention has been made in consideration of the above situations, and has as its first object to generate a video signal with well-balanced horizontal and vertical resolution.

It is another object of the present invention to generate a video signal for easily obtaining stereoscopic vision.

It is another object of the present invention to precisely synchronize a plurality of image sensing systems using a simple construction.

It is another object of the present invention to provide an apparatus for easily separating a video signal combined from images taken from different views.

It is another object of the present invention to provide an apparatus for displaying right and left images at positions appropriate to a user by changing display positions.

It is another object of the present invention to provide an apparatus for realizing display-position change using a simple construction.

It is another object of the present invention to provide an apparatus for changing display positions over a wider range.

It is another object of the present invention to realize an apparatus for image-sensing, recording and reproducing the sensed images for obtaining stereoscopic vision, using a simple construction.

Accordingly, the present invention provides a multi-eye image-sensing apparatus comprising: multi-eye image-sensing means for image-sensing an object using a right and a left image-sensing means in synchronization with each other, and for generating a first image signal from the left image-sensing means, and a second image signal, from the right image-sensing means; and signal conversion means for converting the first and second image signals, obtained from the left and right image-sensing means, into a third image signal, wherein said signal conversion means includes selection means for selecting a part of the first image signal and a part of the second image signal, respectively as a first partial image and a second partial image, and wherein the third image signal contains the first and second partial images arranged in a horizontal direction. This construction converts the right and left image signals into a composite image signal where the right and left image signals, having well-balanced horizontal and vertical resolutions, are arrayed in a horizontal direction, and allows recording using an ordinary VTR and the like.

Further, the present invention provides a multi-eye image-sensing apparatus having the above construction, wherein upon arranging the first and second partial images selected by said selection means, as the third image signal, the first partial image is positioned at the right part of the third image signal, and the second partial image is positioned at the left part of the third image signal. This construction enables stereoscopic vision using a reproduced image, by a crossing method.

Further, the present invention provides an image-signal converting apparatus that inputs a first image signal and a second image signal, respectively obtained by a left image-sensing means and a right image-sensing means in synchronization with each other, and generates a third image signal from the input first and second image signals, comprising selection means for selecting a part of the first image signal and a part of the second image signal, respectively as a first partial image and a second partial image, wherein said apparatus generates the third image signal by arranging the first and second partial images, selected by said selection means, in a horizontal direction. This construction converts the right and left image signals into a composite image signal where the right and left image signals, having well-balanced horizontal and vertical resolutions, are arrayed in a horizontal direction, without increasing the size and the weight of an image-sensing apparatus, and enables recording by an ordinary VTR and the like.

Further, the present invention provides an image-signal converting apparatus having the above construction, wherein upon arranging the first and second partial images selected by said selection means, as the third image signal, the first partial image is positioned at the right part of the third image signal, and the second partial image is positioned at the left part of the third image signal. This construction enables stereoscopic vision using a reproduced image by a crossing method.

Further, the present invention provides a multi-eye image-sensing apparatus comprising: a plurality of optical means having optical axes different from each other; a plurality of solid-state image-sensing devices for converting object images, obtained by said plurality of optical means, into electric signals; image-sensing device drive means for driving said solid-state image-sensing devices; a plurality of video-signal processing means equal to the number of said solid-state image-sensing devices, for converting image signals from said solid-state image-sensing devices into predetermined video signals; reference-clock generating means for generating a reference clock of a predetermined frequency; a plurality of drive-pulse generating means respectively for supplying a drive pulse to said image-sensing device drive means; signal-processing pulse generating means for generating timing pulses for operating said plurality of video-signal processing means, based on the reference clock; and reset-signal generating means for generating reset signals to initialize said drive-pulse generating means and said signal-processing pulse generating means, wherein said plurality of drive-pulse generating means and said signal-processing pulse generating means are initialized in response to the reset signal, and wherein after initialization, said plurality of drive-pulse generating means operate in synchronization with each other, and said signal-processing pulse generating means supplies the same timing pulse to said plurality of video-signal processing means. This enables synchronization of a plurality of image sensing systems of a multi-eye image sensing apparatus, using a simple construction.

Further, the present invention provides an image-signal converting apparatus that separates a composite image signal, in which a first image signal and a second image signal are arranged in a horizontal direction within one field, into a third image signal including the first image signal and a fourth image signal including the second image signal. This construction easily separates an image signal which is a combination of images taken from different views.

The image-signal converting apparatus may be arranged such that at least one of a display position, where the first image signal within the field of the third image signal is displayed, and a display position, where the second image signal within the field of the fourth image signal is displayed, is changeable. This can change display positions of the right and left images for the user's convenience.

Further, the image-signal converting apparatus may further comprise: first delay means for delaying at least one of the first image signal and the second image signal, by a first delay time; and second delay means for delaying a horizontal synchronizing signal, a vertical synchronizing signal or a compound synchronizing signal of the composite signal, by a second delay time, wherein said apparatus separates the first and second image signal, at least one of which is delayed, and generates the third and fourth image signals, with the compound synchronizing signal delayed by said second delay means as a synchronizing signal for the third and fourth image signal. This enables changing of display position using a simple construction.

Otherwise, the image-signal converting apparatus having the above construction may further comprise: separation means for separating a horizontal synchronizing signal, a vertical synchronizing signal or a compound synchronizing signal of the single-system image signal, into synchronizing signals of two systems; first delay means for delaying one of the synchronizing signals, separated by said separation means, by a first delay time; and second delay means for delaying one of the synchronizing signals, other than the synchronizing signal delayed by said first delay means, by a second delay time, said apparatus separates the first and second image signals and generates the third and fourth image signal, with the synchronizing signal delayed by said first delay means as a synchronizing signal of the third image signal, and the synchronizing signal delayed by said second delay means as a synchronizing signal of the fourth image signal. This attains a wider display-position changeable range.

Further, the present invention provides a display apparatus comprising a right display unit for observing, with a right eye, a right image for right eye, and a left display unit for observing, with a left eye, a left image for left eye, wherein the right and left images are respectively a third image signal and a fourth image signal, separated from a single-system image signal containing a first image signal and a second image signal arranged in a horizontal direction within one field, the third image signal including the first image signal and the fourth image signal including the second image signal, and wherein at least one of a right-image display position where the first image signal is displayed within the field of the third image signal and a left-image display position where the second image signal is displayed within the field of the fourth image signal is changeable. This construction can change display positions of the right and left images for the user's convenience.

The display apparatus may be arranged such that the right-image display position on the right display unit and the left-image display position on the left display unit are changeable in accordance with the interval between the right eye and the left eye. This construction can easily change the display positions of the right and left images in accordance with the interval between the eyes of the user.

Further, the present invention provides a multi-eye image-sensing and recording and reproduction apparatus, having right-image sensing means and left-image sensing means, comprising: recording means for recording an image signal, in which partial image signals of right and left image signals obtained by said right and left image-sensing means are arranged in a horizontal direction within one field, on a recording medium; and reproduction means for reproducing the right and left image signals, from the recording medium, separating the partial image signals from the right and left image signals, and changing display positions where the partial image signals are displayed. This realizes a system for image-sensing, recording and reproducing for obtaining stereoscopic vision, using a simple construction.

According to the present invention, an image where the right and left images are combined can be displayed for obtaining stereoscopic vision by a crossing method. Otherwise, the right and left images can be displayed separately, for use of a HMD. In this case, the display positions of the right and left images can be adjusted in accordance with the interval between the right and left eyes of the user. In comparison with mechanical adjustment of the conventional HMD, the present invention can provide downsized and cost-saving image sensing system.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 1A to 1C are block diagrams showing a recording and reproduction method according to the present invention;

FIGS. 6A and 6B are block diagrams showing a display method according to the present invention;

DETAILED DESCRIPTION OF THE PREFERRED EMBODIMENT(S)

Preferred embodiments of the present invention will be described in detail in accordance with the accompanying drawings.

In the following preferred embodiments, further shortcomings as described hereinafter are solved.

For example, Japanese Patent Application Laid-Open No. 63-107389 discloses, a multi-eye image sensing apparatus for obtaining a right image and a left image in a synchronized manner. The apparatus operates a plurality of image sensing devices with a single drive pulse.

Further, as another example, a construction having a synchronizing-signal generating means, in which the other elements operate in synchronization with a reference signal, generated by the synchronizing-signal generating means, using a phase lock loop (PLL) circuit, is known.

In the former example, the plural image sensing devices are driven by the same pulse, however, synchronizing signals other than the drive pulse, e.g., horizontal and vertical synchronizing signals and synchronizing signals for color subtransmission waves are not taken into consideration. Accordingly, upon generating a television signal from image signals read from the image sensing devices, another synchronizing circuit such as a PLL circuit is required.

In the latter example using the PLL circuit, the circuitry is complicated. Further, since the PLL's synchronizing precision varies depending upon temperature, this construction cannot provide stable operation.

Figure 10:
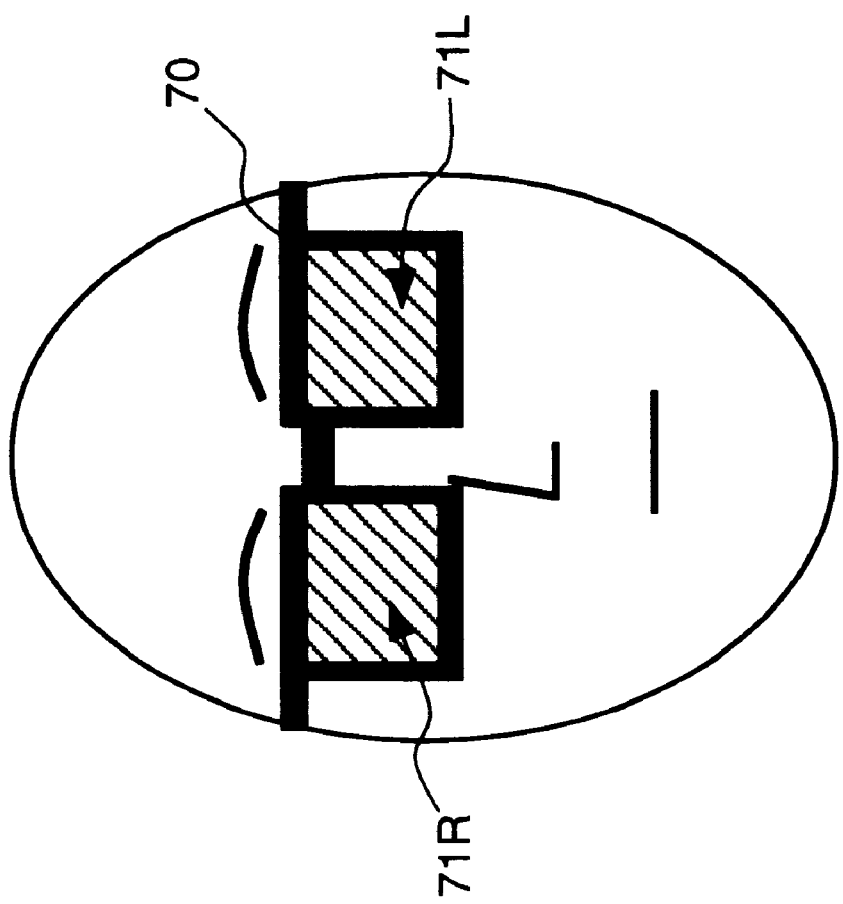
FIG. 10 is an explanatory view showing the construction of the conventional head mounted display.

FIG. 10 shows a head mounted display (HMD) 70 for obtaining stereoscopic vision. The HMD has two display units 71R and 71L for observing right images and left images independently with right eye and left eye. The display units 71R and 71L are, e.g., liquid crystal display devices. Regarding such observing apparatus, a device having an adjustment mechanism (not shown) for adjusting support members of the display units, to set an appropriate interval between the right and left display units for the user is known.

However, in a case where the interval between the display units is mechanically adjusted, the position adjustment mechanism enlarges the mechanical part of the device, and increases the total weight of the device.

First Embodiment

A first embodiment of the present invention will be described with reference to FIGS. 1A–1C to FIGS. 6A–6B.

FIGS. 1A to 1C show a recording and reproduction method according to the first embodiment.

In this embodiment, two cameras to be described later image-sense an object to obtain a right image 1R and a left image 1L as shown in FIG. 1A. A hatched portion t represents the portion actually recorded upon image recording by a VTR to be described later.

Upon image recording using a VTR, the hatched portions t of the images 1R and 1L are combined into one image such as an image 2 in FIG. 1B, and the combined image is recorded. In the image 2, the left half portion ("R" in FIG. 1B) corresponds to the image 1R, and the right half portion ("L"), to the image 1L.

For reproduction of recorded image two methods may be employed. One method is to reproduce the recorded combined image on one screen, such as the image 2 in FIG. 1B. Note that reference numerals 4R denotes a viewer's right eye, and 4L, the viewer's left eye. In this display method, the viewer sees the image portion R with his/her right eye 4R, and sees the image portion L with his/her left eye 4L. This display method uses what is called a crossing method, for obtaining stereoscopic vision. This enables the viewer to directly obtain stereoscopic vision with the naked eyes or to indirectly obtain stereoscopic vision using an optical adapter means.

The other display method is to display the right and left images on separate screens, such as images 3R and 3L in FIG. 1C. In FIG. 1C, the image 3R for right eye corresponds to the image 1R, and the image 3L for left eye, to the image 1L. On an actual display monitor, hatched portions of the images 3R and 3L are actually displayed, while blank portions are muted are e.g. black areas. This display method is appropriate to a head-set type stereoscopic image observing apparatus using small-sized liquid crystal display means, such as a HMD.

Next, the construction for displaying images in accordance with the above display methods will be described.

<Image Sensing Process>

Figure 2:
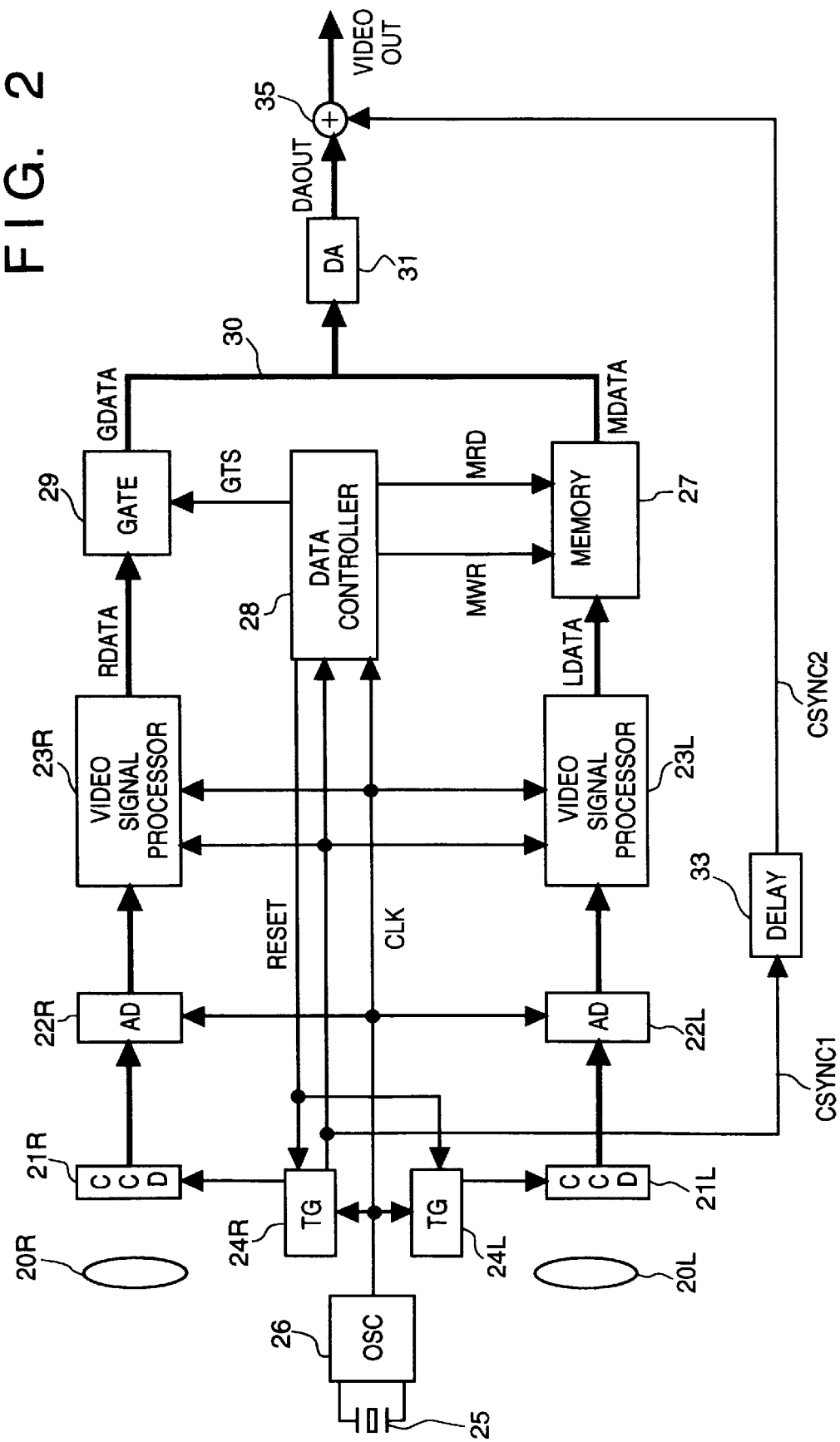
FIG. 2 is a block diagram showing the construction of a multi-eye camera of a multi-eye image-sensing/recording/reproduction apparatus according to a first embodiment of the present invention.

FIG. 2 shows the construction of a multi-eye camera, as an image sensing unit, that image-senses an object with a parallax and obtains two images for stereoscopic vision. In FIG. 2, numerals 20R and 20L denote right and left optical systems such as lenses, for image-sensing an object; 21R and 21L, right and left image sensing devices such as CCD's, for converting right and left images from the optical systems 20R and 20L into electric signals; 22R and 22L, right and left A/D converters for converting the analog signals from the image sensing devices 21R and 21L into digital signals; 23R and 23L, right and left video signal processors for converting the A/D-converted signals from the image sensing devices 21R and 21L into video signals; and 24R and 24L, right and left timing signal generators (TG's) for generating CCD drive pulses for the image sensing devices 21R and 21L and television synchronizing signal.

Numeral 25 denotes a crystal, that oscillates at a predetermined frequency; 26, a clock oscillator for amplifying the output of crystal 25 to supply a clock to the system; 27, a memory for temporarily storing image data; 28, a data controller for controlling writing/reading of data into/from the memory 27, and controlling flows and timings of other signals; 29, a gate for switching passing/not passing data from the video signal processor 23R to the next component; and 30, a data bus for transferring data (GDATA) from the gate 29 or data (MDATA) from the memory 27 to the next component.

Numeral 31 denotes a D/A converter for converting the digital signal from the previous component into an analog signal (DAOUT); 33, delay circuit for delaying a compound synchronizing signal CSYNC1, which is one of television synchronizing signals, by a predetermined time; and 35, an adder for adding the image signal (DAOUT) and the signal CSYNC1 into a video signal (VIDEOOUT).

The data controller 28 outputs, as various control signals, a gate signal GTS, a write control signal MWR, a read control signal MRD and a reset signal RESET to initialize the right and left timing signal generators 24R and 24L.

The timing signal generator 24R supplies the television compound timing signal CSYNC1 to the video signal processors 23R and 23L, the data controller 28 and the delay circuit 33.

The clock oscillator 26 supplies a system clock CLK to the timing signal generators 24R and 24L, the AD converters 22R and 22L, the video signal processors 23R and 23L and the data controller 28.

Next, the operation of the multi-eye camera having the above construction, using two image-sensing systems will be described below.

The right and left timing signal generators 24R and 24L, the video signal processors 23R and 23L and the data controller 28 operate in synchronization with the same clock CLK as a reference clock. Accordingly, the respective block for right eye and the block for left eye operate at the same speed. When the power (not shown) of the apparatus is turned on, the data controller 28 outputs the RESET signal to the timing signal generators 24R and 24L. The timing signal generators 24R and 24L are simultaneously initialized at the timing of the system clock and the RESET signal, then generate drive pulse for the image sensing devices and television synchronizing signals, for synchronization with each other. The image sensing devices 21R and 21L convert object images into electric signals in synchronization with each other. Further, the video signal processors 23R and 23L operate at the speed of the same clock CLK, and generate right and left video signals in synchronization with each other. Also, various television synchronizing signals such as the CSYNC are generated and A/D converted at the same timing.

The television synchronizing signals such as the CSYNC1 may be respectively taken from the timing signal generators 24R and 24L and independently supplied to the video signal processors 23R and 23L. However, in this embodiment, the two synchronizing signals are outputted at the same timing, and only one of two synchronizing signals is used to decrease the number of connectors or IC pins in wiring.

The above construction and operation realizes synchronized driving of the image sensing devices 21R and 21L and the video signal processors 23R and 23L, with a small-number of circuits, and omits the conventional PLL circuit.

Next, the operation timings of the multi-eye camera will be described with reference to FIG. 3.

Figure 3:
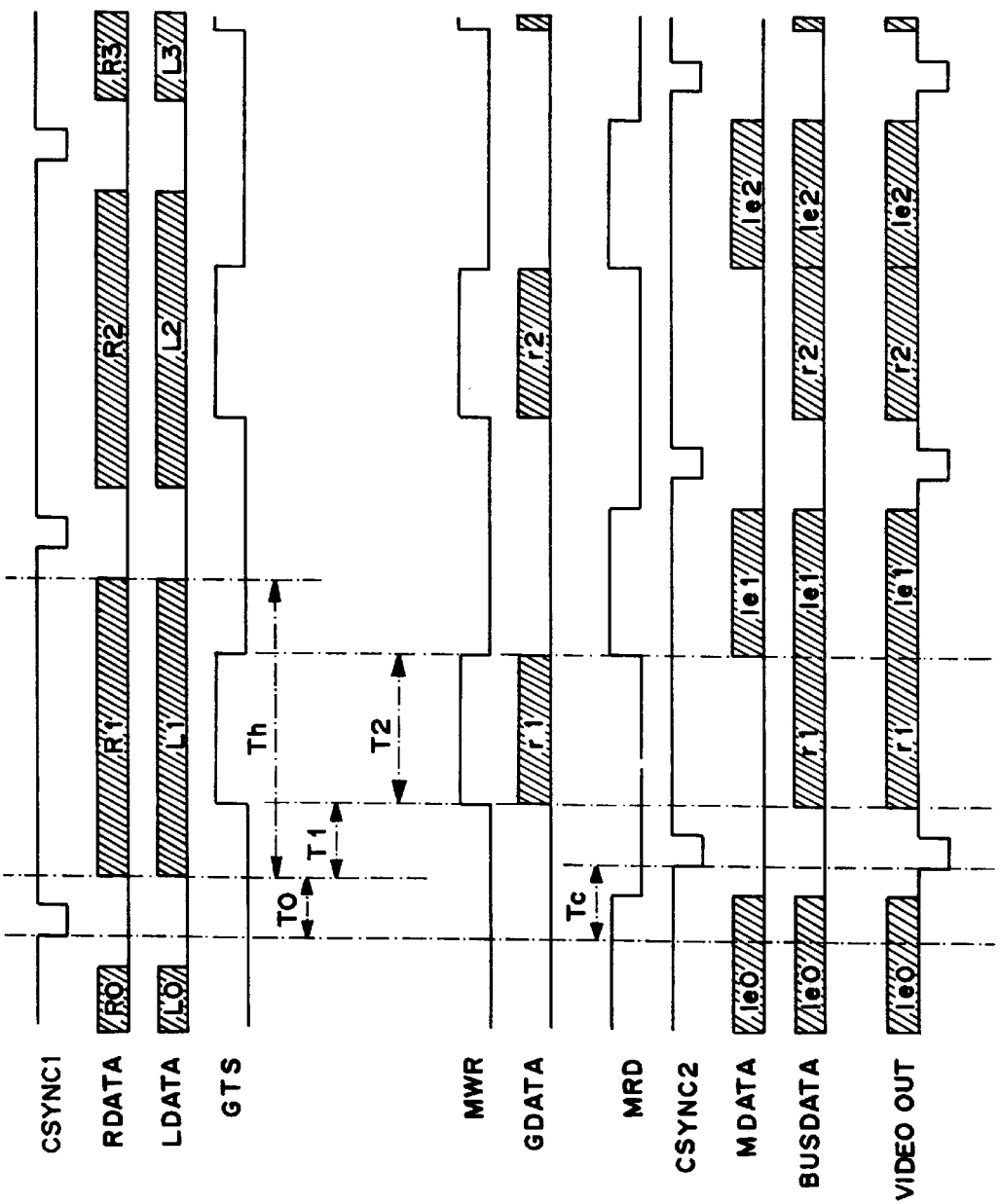
FIG. 3 is a timing chart showing recording timings in the multi-eye camera.

In FIG. 3, shows, for the sake of simplicity, only representative timing parts of the synchronizing signal CSYNC1, other than a vertical blanking part. That is, the signal shown corresponds to several lines of a display portion in actual television display.

The data RDATA and LDATA from the image sensing devices 21R and 21L after A/D conversion are outputted at the same timings with reference to the signal CSYNC1.

At this time, the data controller 28 starts time measurement at the falling edge from a high level to a low level of the signal CSYNC1, and outputs the gate signal GTS from a point where time (T0+T1) has elapsed to a point where time (T0+T1+T2) has elapsed, to the gate 29. T0 is a time period between the falling edge of the signal CSYNC1 to the start of effective horizontal scanning; T1, time set to be about ¼ of effective horizontal scanning time Th; and T2, time set to be about ½ of the effective horizontal scanning time Th. The gate 29 outputs data (GDATA) to the bus 30 while the GTS signal is at the high level.

At the same time, the data controller 28 outputs the write control signal MWR to the memory 27 at the same timing as the output timing of the GTS signal. The memory 27 holds the data from the video signal processor 23L while the MWR signal is outputted. Also, the data controller 28 outputs the read control signal MRD, delayed by ½ Th, to the memory 27. Then, the data (MDATA) is read from the memory 27 onto the bus 30. The memory 27 operates as a data delay circuit for delaying data by ½ of the effective horizontal scanning time.

The data on the bus 30 is outputted (BUSDATA), as right image data (r0, r1, r2 . . . ) or left image data (le0, le1, le2 . . . ) during the horizontal scanning periods. The signal CSYNC1 is delayed by time Tc by the delay circuit 33 and produced as a signal CSYNC2 shown in FIG. 3.

The D/A converter 31 converts the BUSDATA into an analog signal, and the adder 35 adds the signal CSYNC2 to the analog signal, into a video signal (VIDEOOUT). Thus, in the right and left image data, about the central portions in horizontal scanning period are partially cut out and combined into one image data. This combined image data can be recorded by an ordinary VTR. If the recorded combined image data is reproduced in the VTR, the data is displayed on an ordinary television screen, as the image 2 in FIG. 1B.

<Image Reproducing Process>

Next, a display converter that converts the above reproduction signal to separate video images such as the images 3R and 3L in FIG. 1C will be described.

Figure 4:
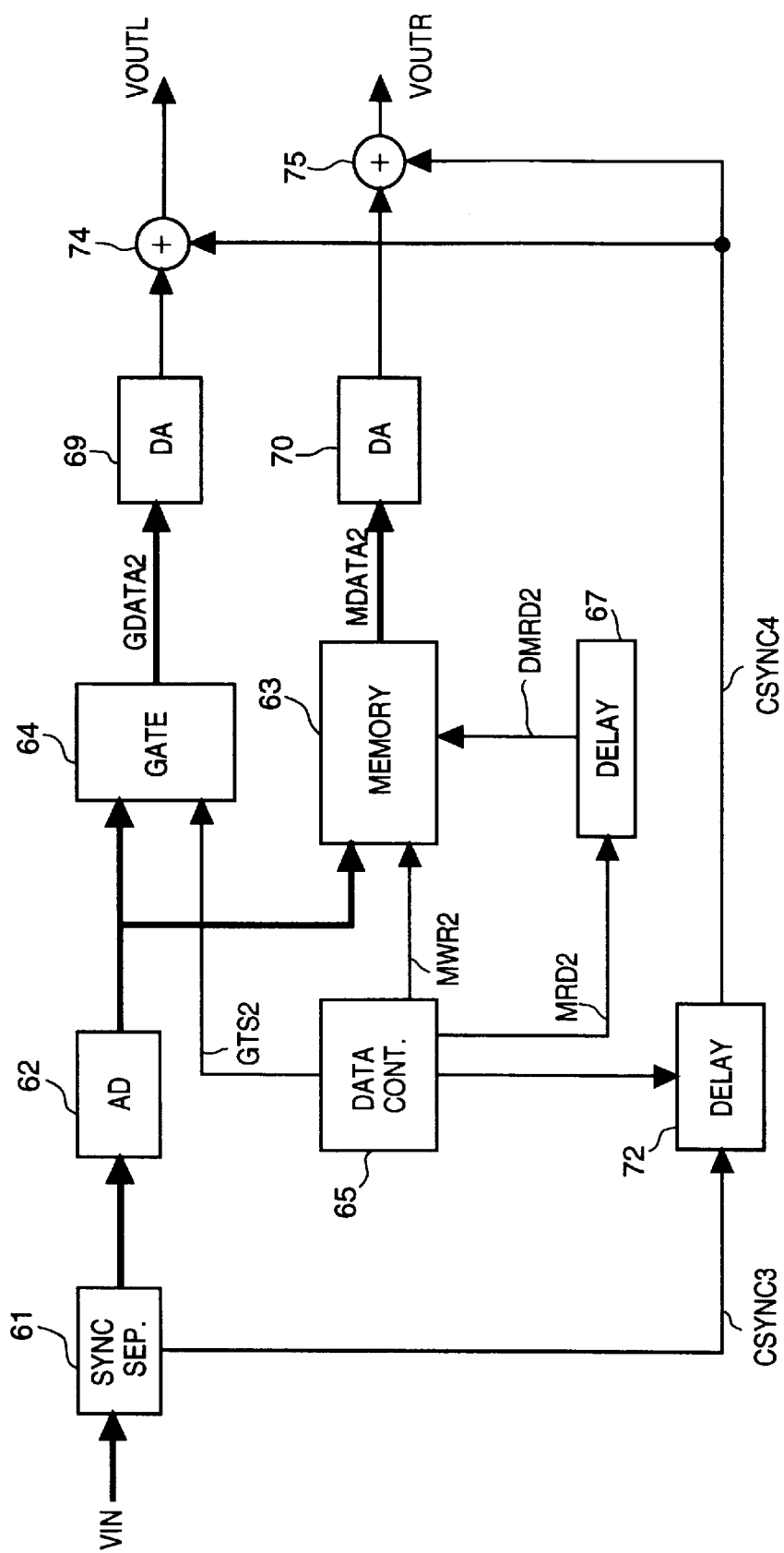
FIG. 4 is a block diagram showing the construction of a display converter.

FIG. 4 shows the construction of a display converter. In FIG. 4, numeral 61 denotes a synchronizing signal separator for extracting a compound synchronizing signal CSYNC from a video signal VIN, to separate the signal VIN into an image signal and a synchronizing signal (CSYNC3); 62, an A/D converter for converting the analog image signal from the synchronizing signal separator 61 into a digital signal; 63, a memory for temporarily storing the image signal; 64, a gate for transferring the image signal to the next component for a predetermined period; and 65, a data controller for controlling read/write to/from the memory 63 and other data flows.

The data controller 65 outputs a write control signal MWR2 to the memory 63, a read control signal MRD2 to a delay circuit 67, and a gate control signal GTS2 to the gate 64. The delay circuit 67 delays the read control signal MRD2 by predetermined time and outputs a delayed read control signal DMRD.

Numerals 69 and 70 denote D/A converters; 72, a delay circuit which delays the compound synchronizing signal CSYNC3, separated from the video signal by the synchronizing signal separator 61, by predetermined time, and outputs a delayed compound synchronizing signal CSYNC4; and 74 and 75, adders for mixing the D/A-converted image signal and the compound synchronizing signal CSYNC4 into a video signal for right eye and a video signal for left eye (VOUTL, VOUTR).

The operation of the display converter having the above construction will be described with reference to FIG. 5.

Figure 5:
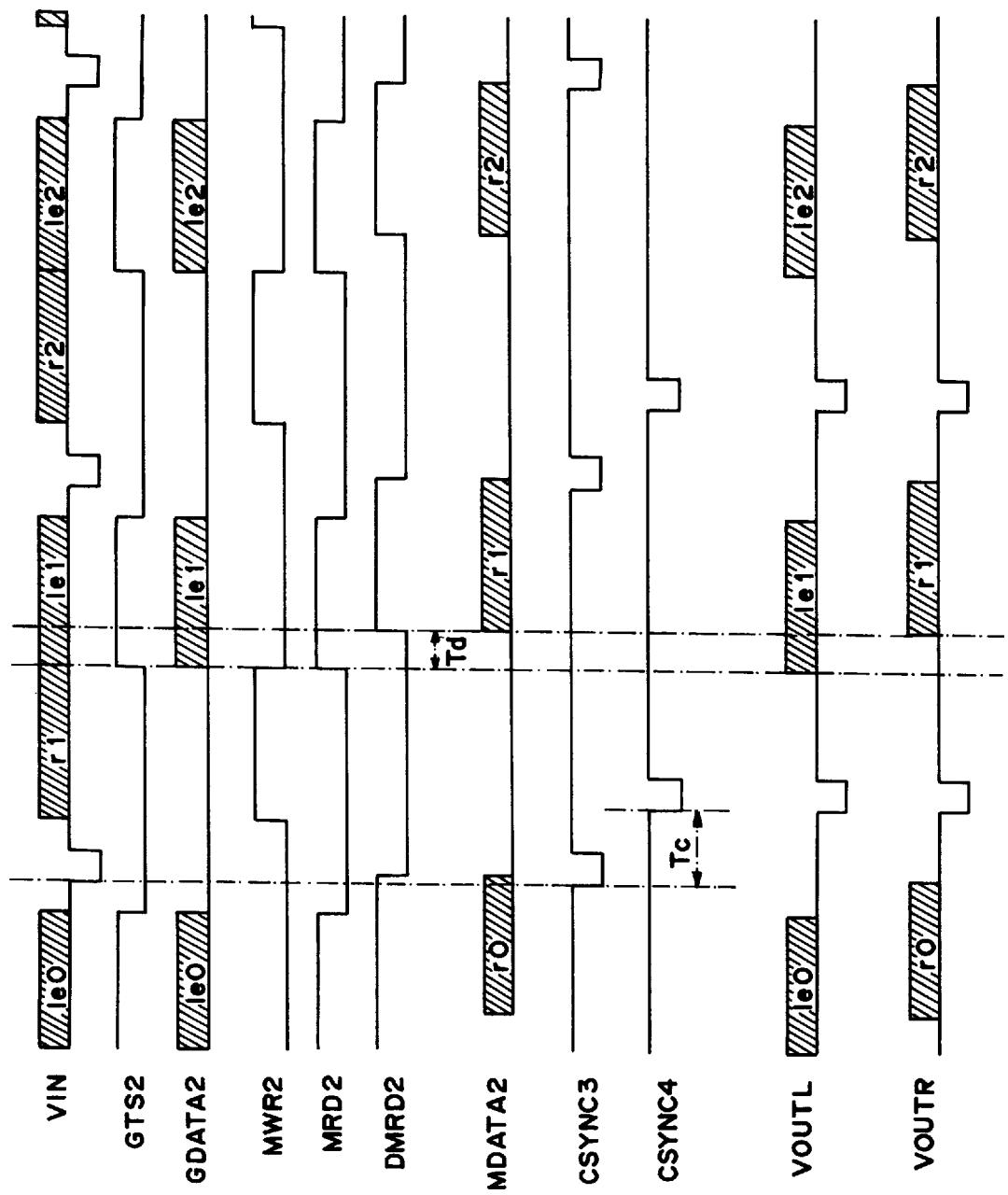
FIG. 5 is a timing chart showing reproduction timings in a reproduction unit.

As shown in FIG. 5, the video signal VIN reproduced by the VTR contains right and left image signals within one horizontal period. This signal VIN is corresponding to the signal VIDEOOUT in FIG. 3.

The data controller 65 outputs the gate control signal GTS2 during the latter half of the horizontal scanning time Th, to the gate 64. Thus, the left image is outputted at the timing of the signal GTS2, as GDATA2.

Also, the data controller 65 outputs the write control signal MWR2 during the first half of the horizontal scanning time Th, to the memory 63. The memory 63 temporarily holds the right image data at this timing. Then the data controller 65 outputs the read control signal MRD2 at the timing of the gate control signal GTS2. The delay circuit 67 delays the read control signal MRD2 by predetermined time Td, and supplies the delayed DMRD2 signal to the memory 63. Accordingly, the image signal in the first half of the horizontal scanning period, i.e., the right image data is temporarily stored in the memory 63 at the timing of the write control signal MWR2, and read from the memory 63 at the timing of the read control signal DMRD2 delayed by time (½ Th+Td), as data MDATA2.

On the other hand, the delay circuit 72 delays the compound synchronizing signal CSYNC3 by time Tc and outputs the delayed signal CSYNC4. The adder 74 mixes the signal CSYNC4 and the D/A-converted image data GDATA2 into the signal VOUTL, and the adder 75 mixes the signal CSYNC4 and the D/A-converted data MDATA2 into the signal VOUTR. The signal VOUTR corresponds to an image for right eye, and the signal VOUTL, an image for left eye, as shown in FIGS. 6A and 6B. In FIGS. 6A and 6B, hatched portions represent actually displayed image areas, and blank portions corresponds muted black area.

FIG. 6A shows a case where the synchronizing-signal delay time Tc is ¼ of the horizontal scanning time (Tc=¼ Th), and the read-control signal delay time Td is ⅛ of the horizontal scanning time (Td=⅛ Th). FIG. 6B shows a case where the synchronizing-signal delay time Tc is ½ of the horizontal scanning time (Tc=½ Th), and the read-control signal delay time Td is also ½ of the horizontal scanning time (Td=½ Th). The delay time TC corresponds to a period from a horizontal-scanning start point to a left-image display position, and the delay time Td, to a period from the horizontal-scanning start point to a right-image display position relatively corresponding to the left-image display point. The interval between the right and left images can be adjusted by setting the delay times Tc and Td to desired values.

As described above, when the right and left images are displayed on, e.g., a HMD, the interval between the right and left images can be adjusted corresponding to the interval between the right and left eyes of a viewer.

Second Embodiment

Next, another method and construction to realize the technique of the present invention will be described below as a second embodiment.

In the first embodiment, the compound synchronizing signal is delayed, and reading of one of the right and left image signals is delayed with respect to the other one image signal. In the second embodiment, the right and left image signals are simultaneously read from the memory (Td=0). In this case, delay time is adjusted by two synchronizing-signal delay circuits provided for the respectively right and left image signals.

In the first embodiment, when the image signal and the synchronizing signal are separately transferred (e.g., transferred as R, G, B signals and a SYNC signal), only one compound synchronizing signal is used for a plurality of display units, which reducing the number of connection cables. In the second embodiment, a range for display position adjustment can be wider than that of the first embodiment. In the first embodiment, as it is apparent from FIG. 6A, the distance between the displayed right and left images becomes the shortest when the two images are moved to the center. This interval cannot be narrowed. On the other hand, in the second embodiment, as compound synchronizing signals for the right and left image signals are independently adjusted, the display positions of the images can be respectively moved. Therefore, the right image can be displayed at the leftmost portion of the screen, and the left image, at the rightmost portion.

Third Embodiment

In the first embodiment, the right image data r1 is delayed by using a memory. In the third embodiment, since the CSYNC signal is controlled respectively for the right and left image data, the memory may be omitted by controlling synchronizing-signal (CSYNC) delay time.

Figure 7:
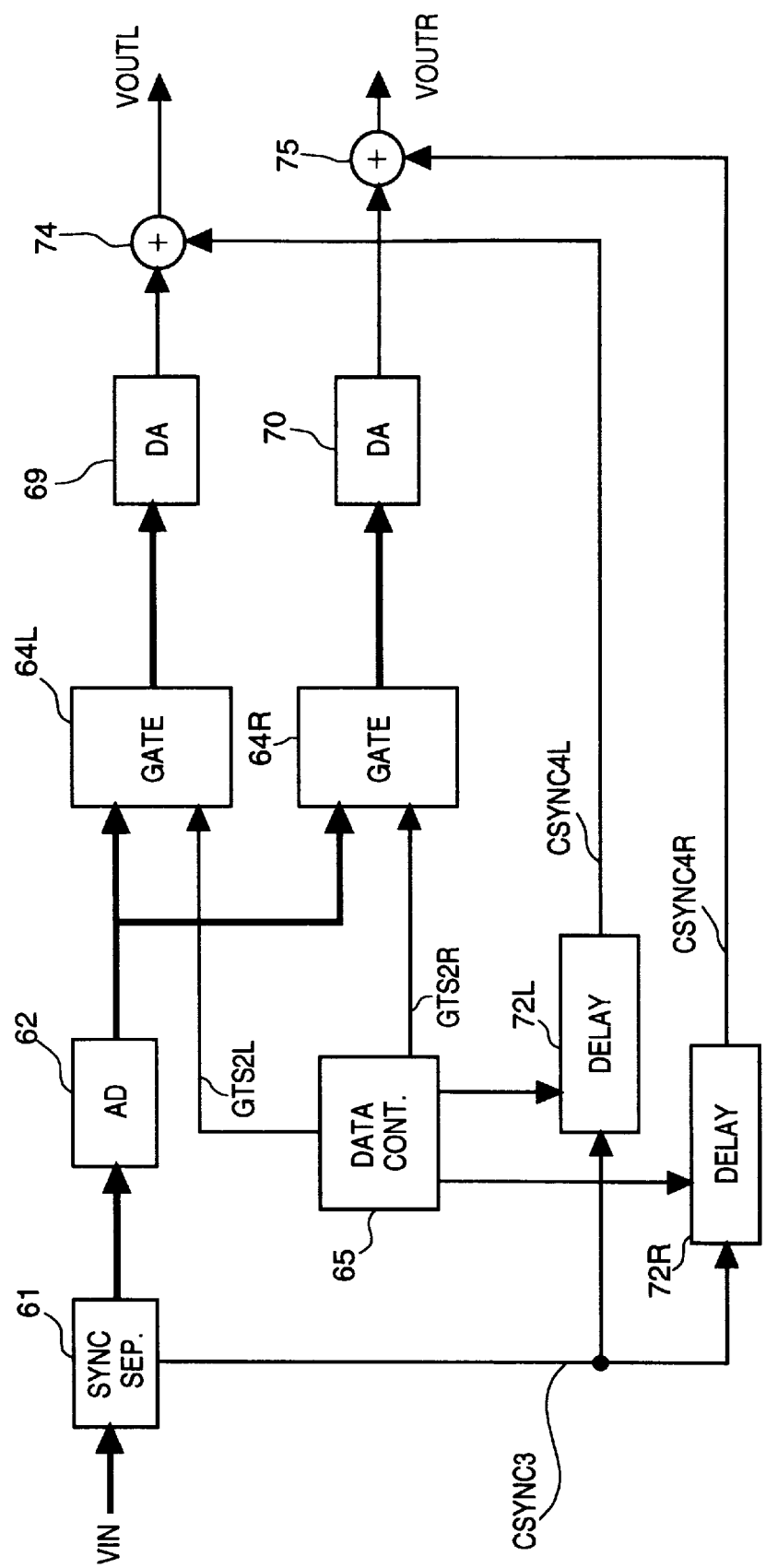
FIG. 7 is a block diagram showing the construction of a camera of a multi-eye image-sensing/recording/reproduction apparatus according to a second embodiment of the present invention.
Figure 8:
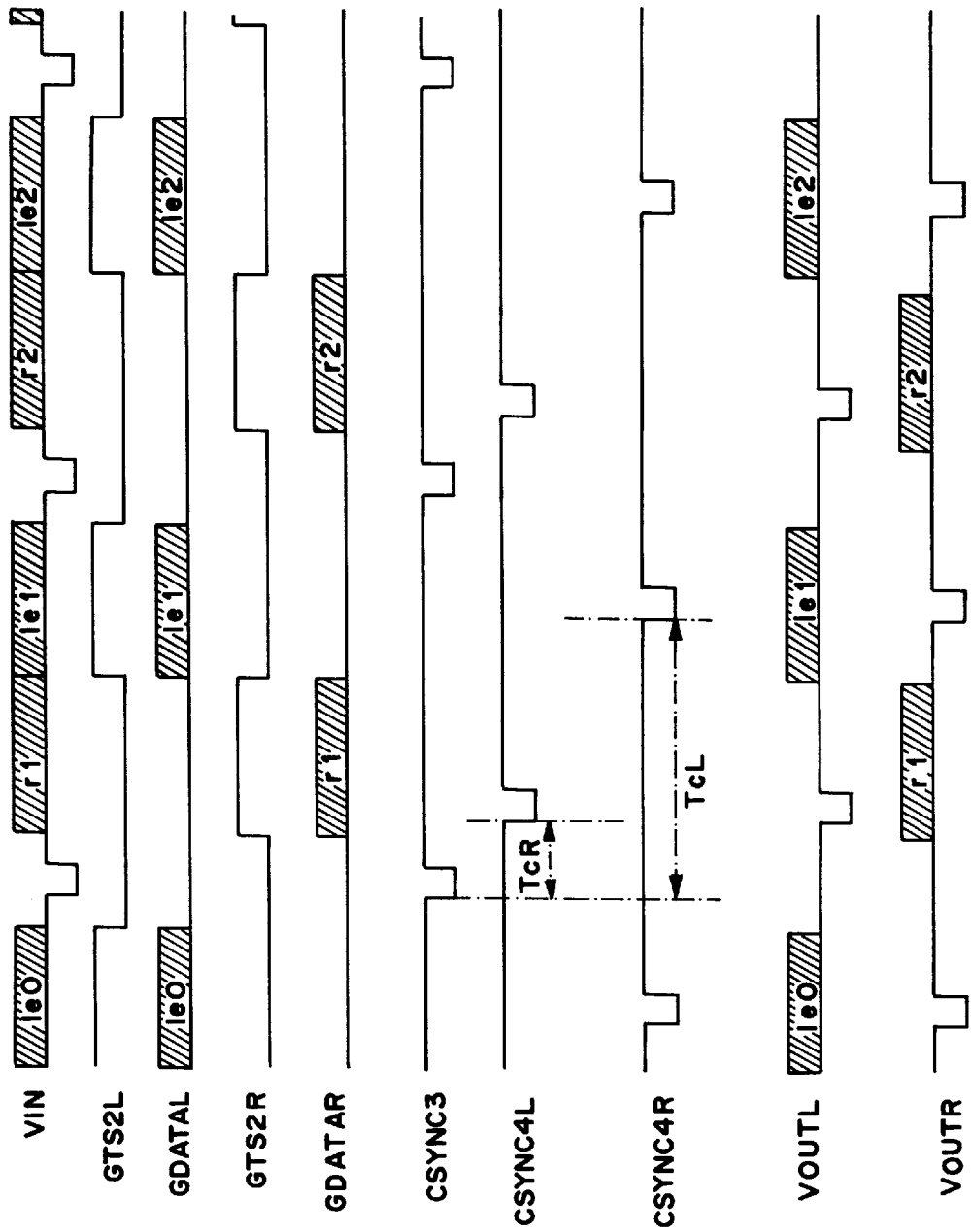
FIG. 8 is a timing chart showing the operation of the camera in FIG. 7.

FIG. 7 shows the construction according to the second embodiment, and FIG. 8, the operation of the construction according to the second embodiment. In FIGS. 7 and 8, the elements corresponding to those in the first embodiment have the same reference numerals. In FIG. 7, gates 64R and 64R are provided for right and left image signals. The data controller 65 outputs gate control signals GTS2R and GTS2L to the gates 64R and 64L. Further, delay circuits 72R and 72L are provided for delaying the synchronizing signal CSYNC3 and outputting delayed synchronizing signals CSYNC4R and CSYNC4L. The adders 74 and 75 add the delayed synchronizing signals to the image signals, and output the video signals VOUTL and VOUTR. The video signals VOUTR and VOUTL may be displayed on a display unit such as an ordinary CRT display monitor, as images as shown in FIGS. 6A and 6B.

Since this embodiment needs no memory, the scale of the construction can be small, which reduces the total cost and saves electric consumption.

Further Modifications

In the first and second embodiments, the image sensing unit (FIG. 2) and the signal converter (FIGS. 4 and 7) are separate units. However, these units may be combined and packed into one casing. For example, the image sensing unit and the signal converter for recording are integrally provided as one unit, and the recording unit (VTR), the signal converter for reproduction and display, and the display unit may be separate units. In this case, the number of connection cables can be reduced, which improves operability of the image sensing unit.

Otherwise, the image sensing unit, the signal converter for recording and the signal converter for reproduction and display may be integrally provided as one unit, and the recording unit (VTR) and the display unit may be separate units. In the previous example, for simultaneous reproduction of right and left images, the number of connection cables is increased, however, in this example, the number of connection cables is not changed even in simultaneous reproduction of right and left images.

Otherwise, the image sensing unit and the signal converter for recording may be integrally provided as one unit, the signal converter for reproduction and display and the display unit may be integrally provided as one unit, and the recording unit (VTR) may be separate unit. In the previous example, the scale of the circuitry of the image sensing portion might be enlarged or electric consumption might increase, however, in this example, as circuits are discretely arranged and the above problems can be solved.

Otherwise, the image sensing unit, the signal converter for recording, the signal converter for reproduction and display, and the recording unit (VTR) may be integrally provided as one unit, and the display unit may be a separate unit. In this case, cable connection can be easily made. In addition, the position of the display unit may be set more freely, further, the type of display unit may be more freely determined.

Otherwise, the image sensing unit, the signal converter for recording, the signal converter for reproduction and display, the recording unit (VTR) and the display unit may be provided as one unit. This construction needs no connection member, which reduces the total cost. Further, communication signal line between the VTR and the display device can be internally connected within the unit, which enables the respective devices to interlock with each other, thus improves operability.

Note that for the sake of simplicity, explanations of well-known techniques for ordinary video signal processing, such as filtering and level exchange have been omitted. In practical operation, these processings are performed in accordance with necessity.

Note that the video signal may be a composite signal or RGB component signals. In case of analog composite signal or analog component signals, as it is necessary to synchronize the phase of color transmission waves for both right and left images, the easiness in synchronization of two image sensing systems attained by the present invention is advantageous in comparison with the conventional art.

In a case where a HMD is used for image display, other methods for adjusting right and left display positions can be provided. For example, a viewer may manually adjust the right and left display positions. This can be realized with a relatively low cost. Otherwise, the view axes of the viewer may be detected. To realize this detection, images for position adjustment may be displayed on the right and left display units so that the viewer watches the images, and the image display positions may be automatically changed to positions where the right and left view axes are in appropriate directions. This automatic adjustment attains more simple manipulation. Otherwise, the automatic adjustment may be employed with mechanical adjustment. This electric position adjustment plus mechanical position adjustment attains a wider adjustment range.

<Construction of Apparatus>

Figure 9:
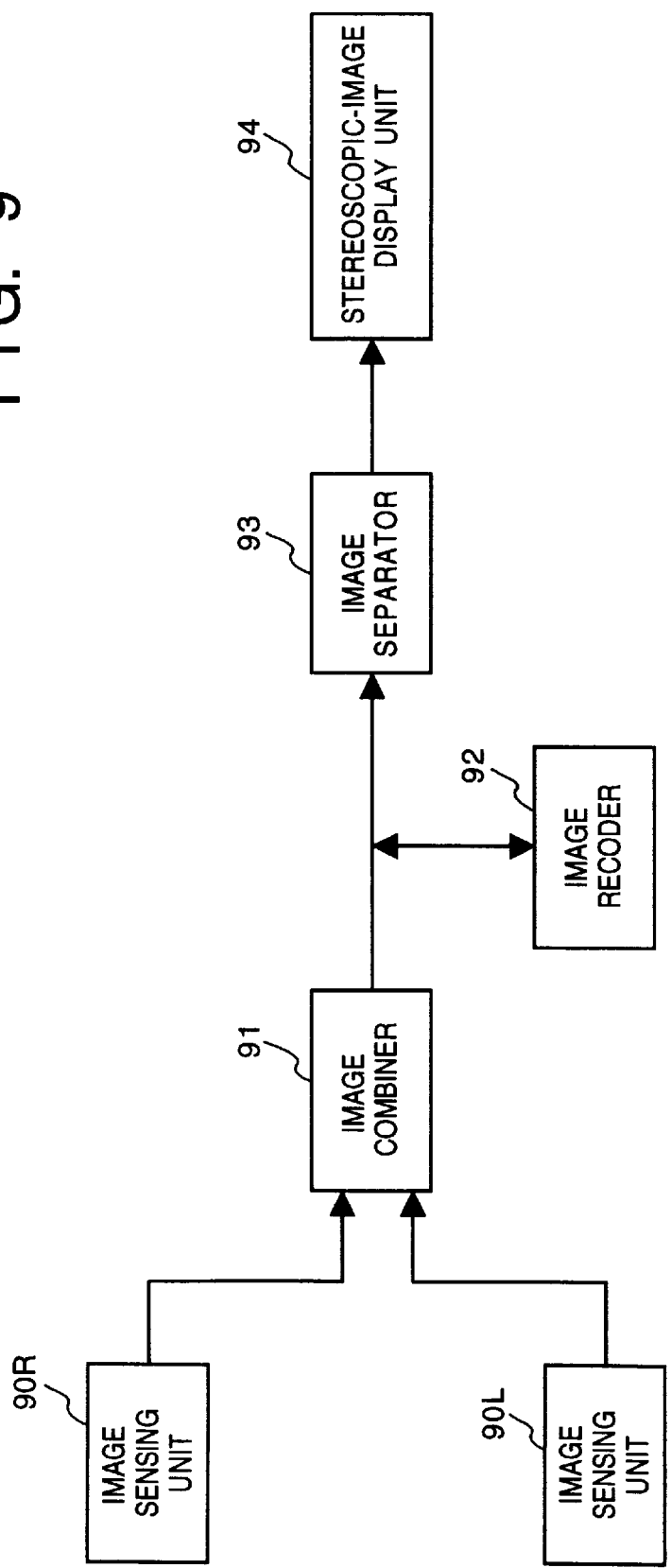
FIG. 9 is a block diagram showing another construction of the multi-eye image-sensing/recording/reproduction apparatus of the second embodiment.

FIG. 9 shows a construction of the multi-eye image-sensing/recording/reproduction apparatus. Numeral 90R denotes an image sensing unit for right image, including the optical system 20R, the CCD 21R, the A/D converter 22R, the video signal processor 23R and the timing signal generator 24R in FIG. 2; 90L, an image sensing unit for left image, including the optical system 20L, the CCD 21L, the A/D converter 22L, the video signal processor 23L and the timing signal generator 24L in FIG. 2; and 91, an image combiner for combining right and left images, including the memory 27, the data controller 28, the gate 29, the data bus 30, the D/A converter 31, the delay circuits 32 and 33, the adder 35. The output from the image combiner 91 is recorded by an image recorder 92 comprising a VTR or a CD recorder.

The output from the image combiner 91 or the image recorder 92 is separated by an image separator 93 into a right image signal and a left image signal. The image combiner 91 has, e.g., the construction shown in FIG. 4 or FIG. 7. The outputs from the image separator 93 are displayed on a stereoscopic-image display unit 94 for stereoscopic vision.

Note that the explanations of the image recorder 92 and the stereoscopic-image display 94 are omitted.

If the image recorder 92 is a portable unit, the apparatus may be separated into an image recording unit including the image sensing units 90R and 90L, and the image combiner 91, and an image reproduction unit including the image separator 93 and the stereoscopic-image display unit 94.

As many apparently widely different embodiments of the present invention can be made without departing from the spirit and scope thereof, it is to be understood that the invention is not limited to the specific embodiments thereof except as defined in the appended claims.

What is claimed is:

1. A multi-eye image-sensing apparatus comprising:

multi-eye image-sensing means for image-sensing an object using a right and a left image-sensing means of a same image frame size in synchronization with each other, and for generating a first image signal from the left image-sensing means, and a second image signal from the right image-sensing means; and signal conversion means for converting the first and second image signals, obtained from the left and right image-sensing means, into a third image signal, wherein said signal conversion means includes selection means for selecting a predetermined part of the first image signal as a first partial image signal and selecting a predetermined part of the second image signal as a second partial image signal, respectively, reading means for reading one of the first and second partial image signals with a delay with respect to the other partial image signal, and means for producing the third image signal by combining the first and second partial image signals of a same image area size in a horizontal direction.

2. The multi-eye image-sensing apparatus according to claim 1, wherein upon arranging the first and second partial images selected by said selection means, as the third image signal, the first partial image is positioned at the right part of the third image signal, and the second partial image is positioned at the left part of the third image signal.

3. An image-signal converting apparatus that inputs a first image signal and a second image signal of a same image frame size, respectively obtained by a left image-sensing means and a right image-sensing means in synchronization with each other, and generates a third image signal from the input first and second image signals, comprising selection means for selecting a part of the first image signal as a first partial image signal and selecting a part of the second image signal as a second partial image signal having a same image area size as that of the first partial image signal, respectively so as to reduce an amount of image data, wherein said apparatus reads one of the first and second partial image signals with a delay with respect to the other partial image signal and generates the third image signal recordable in a standard video recording format by combining the first and second partial image signals, selected by said selection means, in a horizontal direction.

4. The image-signal converting apparatus according to claim 3, wherein upon arranging the first and second partial images selected by said selection means, as the third image signal, the first partial image is positioned at the right part of the third image signal, and the second partial image is positioned at the left part of the third image signal.

5. A multi-eye image-sensing apparatus comprising:

a plurality of optical means having optical axes different from each other;

a plurality of solid-state image-sensing devices for converting object images, obtained by said plurality of optical means, into electric signals;

image-sensing device drive means for driving said solid-state image-sensing devices;

a plurality of video-signal processing means equal to the number of said solid-state image-sensing devices, for converting image signals from said-solid-state image-sensing devices into predetermined video signals;

reference-clock generating means for generating a reference clock of a predetermined frequency;

a plurality of drive-pulse generating means respectively for supply a drive pulse to said image-sensing device drive means;

signal-processing pulse generating means for generating timing pulses for operating said plurality of video-signal processing means, based on the reference clock;

reset-signal generating means for generating reset signals to initialize said drive-pulse generating means and said signal-processing pulse generating means such a manner that said plurality of drive pulse generating means and said signal-processing pulse generating means are initialized in response to the reset signal, and that, after initialization, said plurality of drive-pulse generating means operate in synchronization with each other, and said signal-processing pulse generating means supplies the same timing pulse to said plurality of video-signal processing means; and control means for changing a relative distance of displaying position of the plurality of the predetermined video signals.

6. An image-signal converting apparatus that separates a composite image signal, in which a first image signal and a second image signal having a same image frame size as that of the first image signal are arranged and combined in a horizontal direction with each other within one field based on a standard video recording format, said apparatus comprising:

means for separating the combined image signal in which one of the first and second image signals are recorded with a delay with respect to the other signal;

means for generating a third image signal including the first image signal; and means for generating a fourth image signal including the second image signal, wherein the third image signal and the fourth image signal are operable displaying respectively.

7. The image-signal converting apparatus according to claim 6, wherein at least one of a display position, where the first image signal within the field of the third image signal is displayed, and a display position, where the second image signal within the field of the fourth image signal is displayed, is changeable.

8. The image-signal converting apparatus according to claim 6, comprising:

first delay means for delaying at least one of the first image signal and the second image signal, by a first delay time; and second delay means for delaying a horizontal synchronizing signal, a vertical synchronizing signal or a compound synchronizing signal of the composite signal, by a second delay time, wherein said apparatus separates the first and second image signal, at least one of which is delayed, and generates the third and fourth image signals, with the compound synchronizing signal delayed by said second delay means as a synchronizing signal for the third and fourth image signal.

9. The image-signal converting apparatus according to claim 6, comprising:

separation means for separating a horizontal synchronizing signal, a vertical synchronizing signal or a compound synchronizing signal of the single-system image signal, into synchronizing signals of two systems;

first delay means for delaying one of the synchronizing signals, separated by said separation means, by a first delay time; and second delay means for delaying one of the synchronizing signals, other than the synchronizing signal delayed by said first delay means, by a second delay time, said apparatus separates the first and second image signals and generates the third and fourth image signal, with the synchronizing signal delayed by said first delay means as a synchronizing signal of the third image signal, and the synchronizing signal delayed by said second delay means as a synchronizing signal of the fourth image signal.

10. A display apparatus comprising:

a right display unit for observing, with a right eye, a right image for right eye; and a left display unit for observing, with left eye, a left image for said left eye;

wherein the right and left images are respectively a third image signal and a fourth image signal, separated from a single-system image signal containing a first image signal and a second image signal in which one of the first and second image signals are recorded with a delay with respect to the other image signal, having a same image frame size each other combined in a horizontal direction within one field based on a standard video recording format, the third image signal including the first image signal and the fourth image signal including the second image signal; and wherein at least one of a right-image display position where the first image signal is displayed within the filed of the third image signal and left-image display position where the second image signal is displayed within the field of the fourth image signal is changeable.

11. The display apparatus according to claim 10, wherein the right-image display position on the right display unit and the left-image display position on the left display unit are changeable in accordance with the interval between the right eye and the left eye.

12. A multi-eye image-sensing and recording and reproduction apparatus, having right-image sensing means and left-image sensing means having a same image frame size each other, comprising:

recording means for recording an image signal, in which partial image signals of right and left image signals of a same image area size obtained by said right and left image-sensing means and read in such a way that one of the right and left image signals are read with a delay with respect to the other partial image signal by a reading means, are combined in a horizontal direction within one field based on a standard video recording format, on a recording medium; and reproduction means for reproducing the image signal from the recording medium, separating the right and left partial image signals from the reproduced image signals, and changing display positions where the right and left partial image signals are displayed.

* * * * *